United States Patent
Li

(10) Patent No.: US 9,655,009 B2
(45) Date of Patent: May 16, 2017

(54) SYSTEM AND METHOD FOR INTER-FEMTO ACCESS POINT HANDOFFS

(75) Inventor: Zhiming Li, Schaumburg, IL (US)

(73) Assignee: Futurewei Technologies, Inc., Plano, TX (US)

(*) Notice: Subject to any disclaimer, the term of this patent is extended or adjusted under 35 U.S.C. 154(b) by 558 days.

(21) Appl. No.: 12/877,674

(22) Filed: Sep. 8, 2010

(65) Prior Publication Data
US 2011/0070889 A1 Mar. 24, 2011

Related U.S. Application Data

(60) Provisional application No. 61/243,815, filed on Sep. 18, 2009.

(51) Int. Cl.
| | |
|---|---|
| H04W 36/00 | (2009.01) |
| H04W 36/04 | (2009.01) |
| H04W 36/30 | (2009.01) |
| H04W 48/20 | (2009.01) |
| H04W 84/04 | (2009.01) |
| H04W 88/16 | (2009.01) |
| H04W 92/02 | (2009.01) |

(52) U.S. Cl.
CPC ....... *H04W 36/0033* (2013.01); *H04W 36/04* (2013.01); *H04W 36/30* (2013.01); *H04W 48/20* (2013.01); *H04W 84/045* (2013.01); *H04W 88/16* (2013.01); *H04W 92/02* (2013.01)

(58) Field of Classification Search
CPC ... H04W 36/30; H04W 36/04; H04W 84/045; H04W 52/243; H04W 52/245; H04W 48/20

USPC ............ 455/436–444, 448; 370/331
See application file for complete search history.

(56) References Cited

U.S. PATENT DOCUMENTS

| | | | |
|---|---|---|---|
| 8,331,384 B2* | 12/2012 | Ghai | H04L 63/0272 370/328 |
| 8,498,267 B2* | 7/2013 | Choi-Grogan | H04W 36/0083 370/331 |
| 2008/0132239 A1* | 6/2008 | Khetawat et al. | 455/438 |
| 2008/0132240 A1* | 6/2008 | Baek et al. | 455/442 |
| 2008/0166983 A1* | 7/2008 | Liu | 455/187.1 |
| 2009/0061858 A1* | 3/2009 | Rajasimman et al. | 455/433 |

(Continued)

FOREIGN PATENT DOCUMENTS

| | | |
|---|---|---|
| CN | 1355625 A | 6/2002 |
| CN | 1921701 A | 2/2007 |

(Continued)

OTHER PUBLICATIONS

Li, Y., et al., "IOS based femto cell architecture," X40-20090615-009, 3$^{rd}$ Generation Partnership Project 2, 3GPP2, Jun. 9, 2009, 7 pages.

(Continued)

*Primary Examiner* — Olumide T Ajibade Akonai
(74) *Attorney, Agent, or Firm* — Slater Matsil, LLP

(57) ABSTRACT

A system and method for inter-femto access point handoffs are provided. A method for gateway operations includes receiving a handoff required message, determining a handoff target based on information in the handoff required message, sending a handoff request to the handoff target, performing a bearer update, and initiating a handoff. The handoff target and a handoff source are anchored by a gateway.

32 Claims, 9 Drawing Sheets

(56) References Cited

U.S. PATENT DOCUMENTS

| | | | |
|---|---|---|---|
| 2009/0238027 A1* | 9/2009 | Yamaguchi et al. | 366/73 |
| 2009/0238207 A1* | 9/2009 | Zhao et al. | 370/468 |
| 2009/0262682 A1* | 10/2009 | Khetawat et al. | 370/328 |
| 2010/0040023 A1* | 2/2010 | Gallagher et al. | 370/331 |
| 2010/0069071 A1* | 3/2010 | Simonsson et al. | 455/436 |
| 2010/0069072 A1* | 3/2010 | Gogic et al. | 455/436 |
| 2010/0075675 A1* | 3/2010 | Yang et al. | 455/436 |
| 2010/0113027 A1* | 5/2010 | Hsu | 455/436 |
| 2011/0065439 A1* | 3/2011 | Vargantwar et al. | 455/437 |
| 2012/0270546 A1* | 10/2012 | Yoon et al. | 455/435.1 |

FOREIGN PATENT DOCUMENTS

| | | |
|---|---|---|
| CN | 101472306 A | 12/2008 |
| CN | 101511104 A | 8/2009 |
| EP | 2 086 242 A1 | 8/2009 |
| WO | WO 2009/055827 A1 | 4/2009 |

OTHER PUBLICATIONS

"Interoperability Specification (IOS) for cdma2000 Access Network Interfaces—Part 3 Features," $3^{rd}$ Generation Partnership Project 2, 3GPP2 A.S0013-D, Version 1.0, Jun. 2007, 370 pages.

"Interoperability Specification (IOS) for cdma2000 Access Network Interfaces—Part 4 (A1, A1p, A2, and A5 Interfaces)," $3^{rd}$ Generation Partnership Project 2, 3GGP2 A.S0014-D, Version 1.0, Jun. 2007, 524 pages.

"Interoperability Specification (IOS) for Femtocell Access Points," $3^{rd}$ Generation Partnership Project 2, 3GPP2 A.S0024-0 v1.0, Mar. 2010, 64 pages.

"$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401, V8.6.0, Jun. 2009, 227 pages.

"$3^{rd}$ Generation Partnership Project; Technical Specification Group Services and System Aspects; Architecture aspects of Home NodeB and Home eNodeB (Release 9)," 3GPP TR 23.830, V0.5.0, May 2009, 54 pages.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.9.0, Jun. 2009, 159 pages.

"$3^{rd}$ Generation Partnership Project; Technical Specification Group Radio Access Network; Evolved Universal Terrestrial Radio Access Network (E-UTRAN); S1 Application Protocol (S1AP) (Release 8)," 3GPP TS 36.413, V8.6.1, Jun. 2009, 218 pages.

$3^{rd}$ Generation Partnership Project 2, "Interoperability Specification (IOS) for Femtocell Access Points," 3GPP2 A S0024-A v1.0, Apr. 2011, 128 pages.

International Search Report of the Patent Cooperation Treaty, International Application No. PCT/CN2010/076943 mailed Dec. 30, 2010, 9 pages.

\* cited by examiner

SYSTEM AND METHOD FOR INTER-FEMTO ACCESS POINT HANDOFFS

This application claims the benefit of U.S. Provisional Application No. 61/243,815, filed Sep. 18, 2009, entitled "A Methodology for Optimized inter-Femto Access Point Handoff," which application is hereby incorporated herein by reference.

TECHNICAL FIELD

The present invention relates generally to wireless communications, and more particularly to a system and method for inter-femto access point handoffs.

BACKGROUND

In general, a handoff may occur when a communications device, also commonly referred to as a mobile station, user equipment, terminal, user, and so on, moves out of a coverage area of a first access point, also commonly referred to as a base station, base terminal station, controller, NodeB, enhanced NodeB, and so forth, and into a second access point. When a handoff occurs, control of the communications device's communications changes hands from the first access point to the second access point. There may be a certain level of signaling that occurs in order to setup and perform the handoff.

FIG. 1 illustrates signaling occurring in a prior art handoff for a communications device operating in a code division multiple access (CDMA) 1x Interoperability Specification (IOS) based femto cell communications system 100. As shown in FIG. 1, the signaling is for an inter-femto access point (FAP) handoff, but with both FAPs being connected to a single femto gateway (FGW). In CDMA 1xIOS communications system 100, a mobile station (MS) 105, another name for the communications device, may be communicating through a first FAP 110.

Communications to and from MS 105 may flow through first FAP 110 over a CDMA 1x air interface. First FAP 110 may provide an A1p interface to FGW 120, and FGW 120 may provide an A1p interface to a mobile switching center (MSC)/CDMA softswitch center (MSCe) 125. First FAP 110 may also provide an A2p interface to a media gateway (MGW) 130. A femto security gateway 120, positioned between first FAP 110 and FGW 120 may provide a secure Internet Protocol (IP) tunnel(s) between first FAP 110 and FGW 120 over an unsecured IP transport network used in CDMA 1xIOS communications system 100.

In a macro network comprising a macro base station controller (BSC) 135 and a macro cell 140, when MS 105 crosses a BSC boundary, an inter-BSC handoff occurs and MS 105 reports the signal strength(s) of target cell(s) of the target cells list to a source BSC. The source BSC may then initiate a handoff procedure. A target BSC accepts the handoff and transfers hard handoff parameters to the source BSC via MSC/MSCe 125. The source BSC may dictate MS 105 perform a handoff to the target BSC. When MS 105 appears at the target BSC, the handoff procedure completes.

During an inter-BSC handoff procedure, MSC/MSCe 125 may mainly transfer handoff related information between the source BSC and the target BSC. If a user plane A2p bearer related parameter is changed, MSC/MSCe 125 may maintain the latest A2p bearer related parameter for user plane traffic. MSC/MSCe 125 may also maintain latest cell information of MS 105 for mobility management purposes.

Whenever a MS moves between FAPs connected to the same FGW (such as when MS 105 moves (movement shown as dashed dotted line) into a coverage area of FAP 112, an inter-FAP handoff procedure is initiated. Considering that there may be hundreds or thousands of FAPs connected to a single FGW, a very large number of inter-FAP handoff procedures may be initiated, potentially leading in a huge number of signaling messages coming through MSC/MSCe 125 from FGW 120. MSC/MSCe 125 is required to handle the high number of signaling messages for the MSs, thereby impacting the performance of macro cell users of MSC/MSCe 125.

Therefore, there is a need to reduce the impact of signaling required for femto cell mobility on MSC/MSCe 125 and to reduce bandwidth requirements between FGW 120 and MSC/MSCe 125.

SUMMARY OF THE INVENTION

These and other problems are generally solved or circumvented, and technical advantages are generally achieved, by preferred embodiments of the present invention which provides a system and method for inter-femto access point handoffs.

In accordance with a preferred embodiment of the present invention, a method for operations at a gateway is provided. The method includes receiving a handoff required message, determining a handoff target based on information in the handoff required message and configuration information of access points coupled to the gateway, sending a handoff request to the handoff target, performing a bearer update, and initiating a handoff. The handoff target and a handoff source are access points anchored by the gateway.

In accordance with another preferred embodiment of the present invention, a method for handoff target operations is provided. The method includes receiving handoff request for a communications device. The handoff request is for a handoff involving a handoff target and a handoff source anchored by a gateway. The method also includes performing a bearer update for a bearer, performing a handoff with the communications device, and sending information over the bearer.

In accordance with another preferred embodiment of the present invention, a gateway is provided. The gateway includes a receiver, a transmitter, a handoff target determine unit coupled to the transmitter and to the receiver, a handoff control unit coupled to the transmitter and to the receiver, and a messaging unit coupled to the transmitter and to the receiver. The receiver receives messages, and the transmitter transmits messages. The handoff target determine unit determines a handoff target from a set of possible handoff targets, where the handoff target determine unit determines the handoff target based on information received from a handoff source and configuration information for access points coupled to the gateway. The handoff control unit controls an exchange of information between the handoff target and the handoff source to facilitate a handoff, and the messaging unit generates messages from information to be transmitted.

In accordance with another preferred embodiment of the present invention, an access point is provided. The access point includes a receiver, a transmitter, a handoff participate unit coupled to the transmitter and to the receiver, a messaging unit coupled to the transmitter and to the receiver, and a bearer control unit coupled to the transmitter and to the receiver. The receiver receives messages, and the transmitter transmits messages. The handoff participate unit shares information with a gateway to facilitate a handoff, the messaging unit generates messages from information to be transmitted, and the bearer control unit updates an information bearer resulting from the handoff.

An advantage of an embodiment is that the signaling overhead for inter-femto FAP handoffs at a MSC/MSCe is reduced, thereby reducing a performance impact on the macro network.

A further advantage of an embodiment is that the techniques apply to a wide range of access technologies as well as inter-access technologies. Therefore, the techniques may be used in a wide range of communications system applications.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 7b is a diagram of a control plane 750 of the 3GPP compliant communications system shown in FIG. 7a;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a CDMA 1×IOS compliant communications system supporting femto cells and femto access points. The invention may also be applied, however, to other communications systems capable of supporting small coverage area communications controllers, such as the Third Generation Partnership Project (3GPP) Long Term Evolution (LTE) compliant communications systems supporting Home NodeBs (HeNB), as well as interworkings of such communications systems.

As discussed previously, in a CDMA 1×IOS compliant communications system that supports femto cells and femto access points (FAP), the typically large number of FAPs and their relatively small coverage areas may lead to a large number of inter-FAP handoffs. The previously discussed handoff signaling process involves signaling the handoff through a MSC/MSCe. Therefore, the large number of messages flowing through the MSC/MSCe may have a detrimental impact on the performance of the MSC/MSCe as well as a macro network served by the MSC/MSCe.

However, a large number of inter-FAP handoffs occur between source FAPs and target FAPs served by a single FGW. In such situations, the FGW may be capable of handling the inter-FAP handoff without involving the MSC/MSCe. Therefore, reducing the load on the MSC/MSCe.

Figure 1:
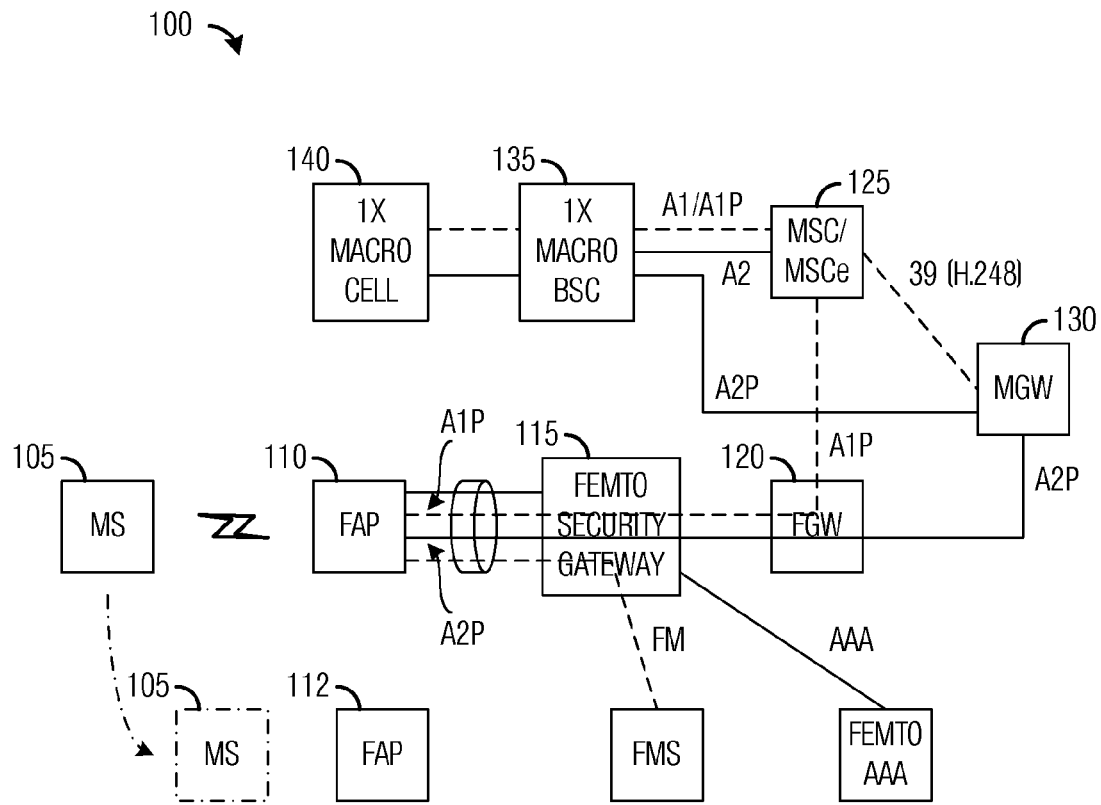
FIG. 1 is a diagram of signaling occurring in a prior art handoff for a communications device operating in a code division multiple access (CDMA) 1× Interoperability Specification (IOS) based femto cell communications system.
Figure 2A:
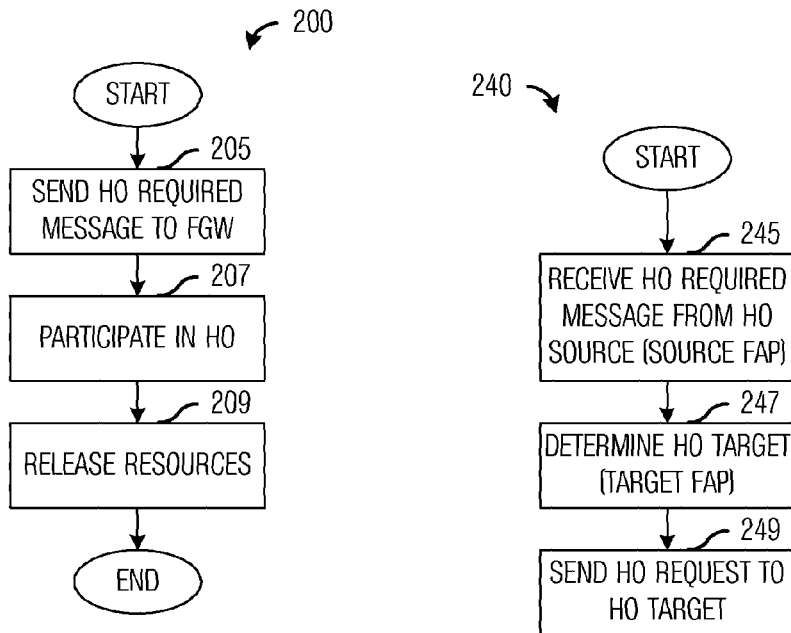
FIG. 2a is a flow diagram of source FAP operations in an inter-FAP handoff.

FIG. 2a illustrates a flow diagram of source FAP operations 200 in an inter-FAP handoff. Source FAP operations 200 may be indicative of operations occurring in a source FAP, i.e., a FAP that is serving a MS that is moving out of a coverage area of the FAP, thereby initiating a HO to another FAP, i.e., a target FAP. Source FAP operations 200 may occur while the source FAP is in a normal operating mode and is serving at least one MS that is moving out of the coverage area of the source FAP.

Source FAP operations 200 may begin with the source FAP sending a HO required message to a FGW (block 205). According to an embodiment, the source FAP may send the HO required message to the FGW in response to a pilot strength measurement message (PSSM) received from the MS. The PSSM may include an indicator of a signal strength of a pilot signal transmitted by the source FAP and received/measured by the MS. If the PSSM indicates that the pilot signal is sufficiently weak, then in order to preserve service to the MS, the MS may need to be served by a different FAP, i.e., the target FAP. The HO required message may include a cell identifier of the target FAP as well as a long code, which identifies the MS within the source FAP uniquely. According to an alternative embodiment, the source FAP may send the HO required message based on its own measurements of transmissions made by the MS or by automatic pilot signal measurements made by the MS, i.e., the MS does not need to specifically initiate the HO by sending the PSSM.

After sending the HO required message to the FGW (block 205), and after HO signaling is performed by the FGW that may or may not involve the source FAP, the source FAP may participate in the HO (block 207). According to an embodiment, the source FAP's participation in the HO may include receiving a HO command from the FGW, sending a HO direction message to the MS, and so forth. Additional operations in participation in the HO may include receiving acknowledgements, and so on.

With the HO complete and the MS now being served by the target FAP, the source FAP may now release resources formerly dedicated to serving the MS (block 209). According to an embodiment, the source FAP may release buffers, bearer information, and so forth, related to the MS, freeing the resources for use with another MS, for example. Source FAP operations 200 may then terminate.

Although the discussion of source FAP operations 200 focuses on a CDMA 1×IOS compliant communications system, the embodiments disclosed herein may apply to other types of networks, such as 3GPP LTE, 3GPP LTE-Advanced, interworking of these networks, and so forth. Therefore, the discussion of the CDMA 1×IOS compliant communications system and associated terminology should not be construed as being limiting to either the scope or the spirit of the embodiments.

Figure 2C:
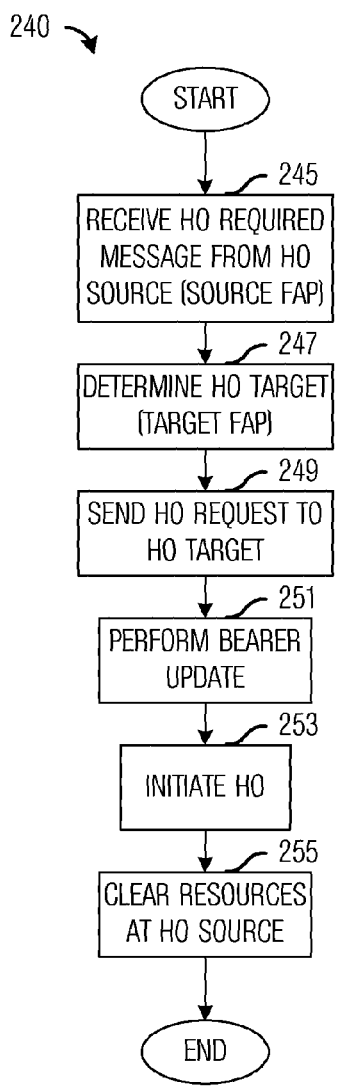
FIG. 2c is a flow diagram of FGW operations in an inter-FAP handoff.
Figure 2B:
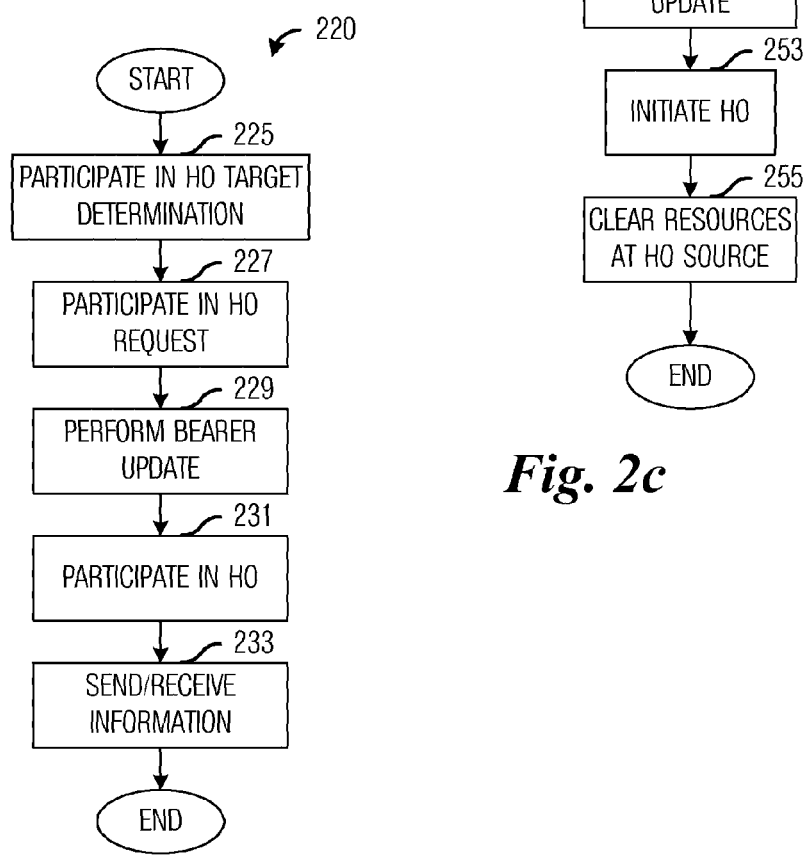
FIG. 2b is a flow diagram of target FAP operations in an inter-FAP handoff.

FIG. 2b illustrates a flow diagram of target FAP operations 220 in an inter-FAP handoff. Target FAP operations 220 may be indicative of operations occurring in a target FAP, i.e., a FAP that is an is to be the FAP that serves a MS after the inter-FAP HO involving a source FAP and the target FAP completes. Target FAP operations 220 may occur while the target FAP is in a normal operating mode and has a MS moving into its coverage area.

Target FAP operations 220 may begin with the target FAP participating in a HO target FAP determination (block 225). According to an embodiment, since there may be a large number of FAPs, a FGW may not be able to determine an identity of the target FAP solely from information provided by the source FAP, such as a cell identifier of the target FAP, which may may not be unique depending on a number of FAPs. Therefore, the FGW may send measurement request messages to FAPs with a long code used by the MS in the source FAP. The FAPs receiving the measurement request messages may then attempt to detect the MS. The FAPs may then report the results of their attempt to detect the MS. The FGW may then determine the target FAP from the reports from the FAPs. For example, the FGW may determine that the FAP that reports a highest detected signal corresponding to the MS as the target FAP.

After being selected as the target FAP, the target FAP may participate in a HO request with the FGW (block 227). According to an embodiment, the FGW may send a HO request to the target FAP and the target FAP may respond with a favorable response if it is amenable to accepting the MS. The HO request from the FGW may include information related to the requirements of the MS and the response from the target FAP may include information about an amount of resources that the target FAP may be able to allocate to the MS.

After being selected as the target FAP and participating in the HO request, the target FAP may perform a bearer update (block 229). According to an embodiment, the bearer update may be in response to information provided by the MS and the FGW. If the handoff request response from the target FAP does not include information regarding the HO, then the target FAP may need to send information about the resources that it may be able to allocate to the MS in a bearer update request. However, if the target FAP has already provided the information in the handoff request response, then the FGW may initial the bearer update without needing a bearer update request from the target FAP. As part of the bearer update, the target FAP actually allocates resources to the MS.

After allocating the bearer, the target FAP may participate in the HO (block 231). According to an embodiment, the target FAP may receive a HO completion message from the MS, which may indicate that the target FAP is now serving the MS. The target FAP may send a HO complete message to the FGW. The target FAP now serves the MS and the target FAP may control information to and from the MS (block 233). Target FAP operations 220 may then terminate.

FIG. 2c illustrates a flow diagram of FGW operations 240 in an inter-FAP handoff. FGW operations 240 may be indicative of operations occurring in a FGW that is serving as a gateway for both a source FAP and a target FAP for a HO. FGW operations 240 may occur while the FGW is in a normal operating mode and is serving both the source FAP and the target FAP.

FGW operations 240 may begin with the FGW receiving a message from a FAP serving a MS (i.e., a source FAP) indicating that the MS may need a HO (block 245). According to an embodiment, the source FAP may send the message indicating that the MS may need a HO in response to a PSMM from the MS. The message from the source FAP may include information regarding a target FAP of the HO, such as a cell identifier of the FAP.

However, since the cell identifier of the FAP provided by the source FAP may not be unique, the FGW may need to identify a FAP that actually corresponds to the cell identifier (block 247). According to an embodiment, the FGW may determine the FAP that actually corresponds to the cell identifier by sending messages to FAPs having the cell identifier along with long code of the MS, and requesting that they measure the MS. In other words, the FGW may determine the FAP that corresponds to the cell identifier based on information in the message (e.g., the cell identifier information) as well as cell configuration information of FAPs connected to the FGW. The cell configuration information may be pre-configured at the FGW or provided by the FAPs. The FAPs may report back to the FGW their measurements of the MS and the FGW may select one of the FAPs as being the actual FAP that corresponds to the cell identifier, i.e., the target FAP. As an example, the FGW may select the FAP that reports the strongest measurement of the MS as the target FAP.

The FGW may then send a HO request to the target FAP (block 249) and participate in a bearer update with the target FAP (block 251). The bearer update may be initiated by either the FGW or the target FAP based on information that is provided by the target FAP in response to the HO request sent by the FGW. As an example, if in its response to the HO request from the FGW, the target FAP provided information regarding what it needs in terms of resources to support the MS, then the FGW may initiate the bearer update. However, if the target FAP did not provide information about what it needs resource wise to support the MS, then the bearer update may be initiated by the target FAP.

After the bearer update completes, the FGW may initiate the HO by sending a HO command to the source FAP (block 253). Once the MS, the source FAP, and the target FAP complete the HO, the FGW may receive a HO complete message from the target FAP. The FGW and the source FAP may then collaborate to clear up resources formerly allocated to the MS (block 255). FGW operations 240 may then terminate.

Figure 3:
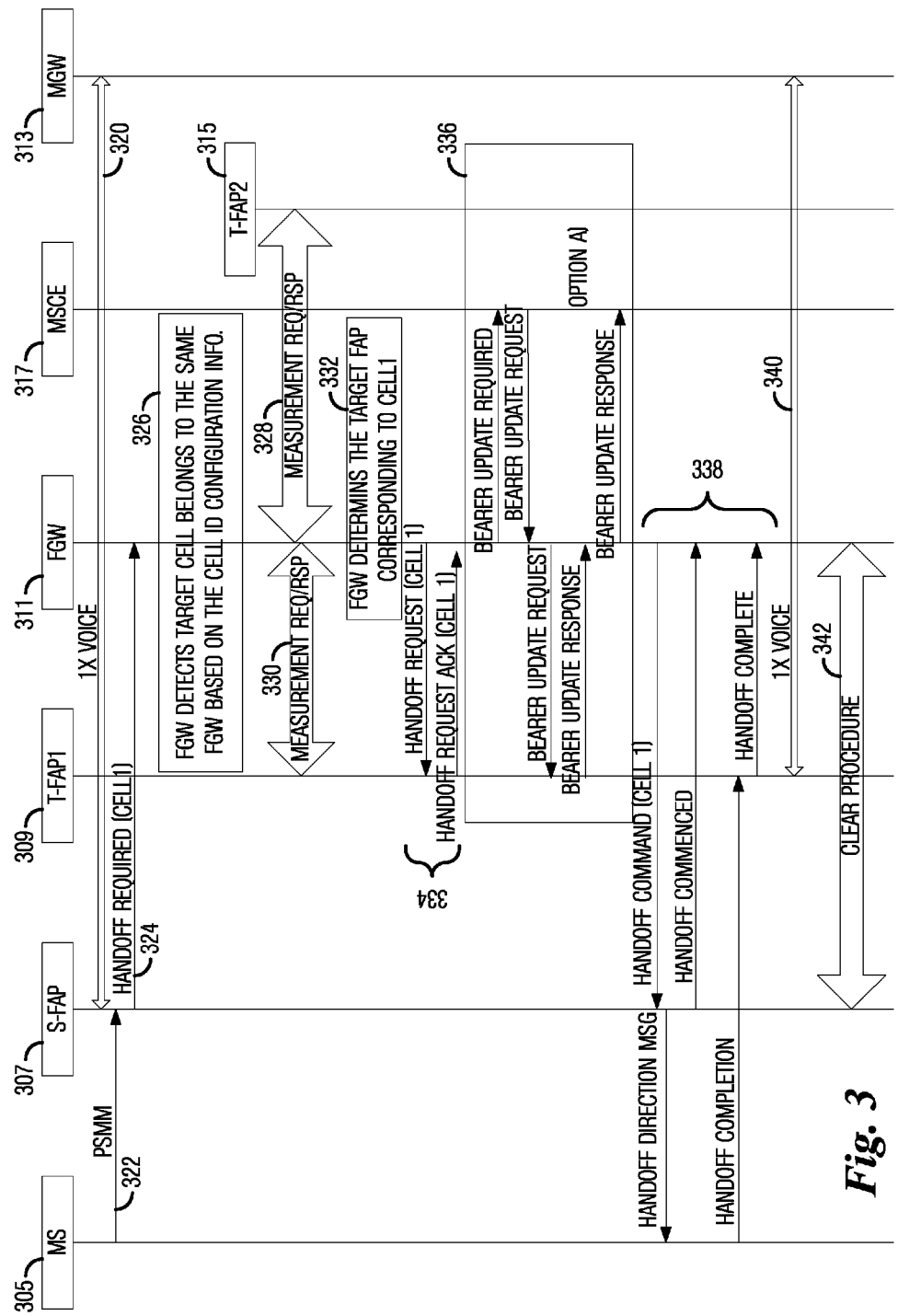
FIG. 3 is a diagram of a message flow of messages/signaling exchanged in a communications system, wherein an inter-FAP handoff is taking place.

FIG. 3 illustrates a message flow of messages/signaling exchanged in a communications system, wherein an inter-FAP handoff is taking place. As shown in FIG. 3, the inter-FAP HO occurs between a MS 305, a source FAP (S-FAP) 307, a first target FAP (T-FAP1) 309, a FGW 311, a MGW 313, a second target FAP (T-FAP2) 315, and a MSC/MSCe 317.

MS 305 may already be participating in a connection, such as a CDMA 1× voice connection (shown as 1×VOICE 320), with a remote entity. As MS 305 is a mobile device, it may be capable of moving while participating in the connection. As MS 305 moves around, MS 305 may detect strong neighbor cell signals and when the strong neighbor cell signals meet a reporting criteria, such as when the strong neighbor cell signals exceed a specified threshold, MS 305 may send a pilot strength measurement message (PSMM) 322 to S-FAP 307.

S-FAP 307, based on information provided in PSMM 322 may decide to perform a HO and send a HO required message to FGW 311. According to an embodiment, the HO required message may contain target cell information (provided by MS 305 in PSMM 322). FGW 311 may examine the target cell information in the HO required message from S-FAP 307 and if the target cell belongs to FGW 311, i.e., served by FGW 311, based on pre-configured information or FAP registration info when FAP is power up, FGW 311 may try to determine which FAP corresponds to the target cell (block 326). In general, a FAP registration procedure may involve a FAP registering itself with a FGW when the FAP is powered up, after being reset/restarted, or so forth. A the completion of the FAP registration procedure, the FGW may have the FAP's identifier, cell configuration information under the FGW, transport layer binding information, and so on.

If there are multiple FAPs that correspond to the target cell information (since a single cell identifier may correspond to multiple FAPs, FGW 311 may need to determine which FAP corresponds to the target cell information. FGW 311 may send measurement request messages to all FAPs that correspond to the target cell information (event 328 and 330). As an example, FGW 311 may send a measurement request message to T-FAP1 309 and T-FAP2 315. The FAPs that receive the measurement request messages from FGW 311 may attempt to detect MS 305 and measure a signal strength of a channel of MS 305, such as the signal strength of a reverse link of MS 305. Each FAP receiving the measurement request message may then report the measured signal strength to FGW 311. In addition to the measured signal strength of MS 305, the FAPs may also report its own transmit power.

Based on the received signal strength information from the FAPs, FGW 311 may be able to uniquely determine an identity of a target FAP as indicated by MS 305 as the target cell (block 332). For discussion purposes, let T-FAP1 309 be the target cell of MS 305. FGW 311 and T-FAP1 309 may then participate in a HO setup operation 334, where FGW 311 may send a HO request message to T-FAP1 309 and T-FAP1 309 may respond regarding its ability/willingness to accept the HO. In the HO request message an A2p bearer parameters on the side of MGW 313 may be the same as that of a bearer to S-FAP 307, so T-FAP1 309 may receive RTP payloads from MGW 313. T-FAP1 309 may allocate appropriate radio resources and responds with an acknowledgement to FGW 311.

The acknowledgement from T-FAP1 309 may contain A2p bearer related parameters on the side of T-FAP1 309 and FGW 311 may initiate a bearer update procedure (block 336) by sending a bearer update required message containing A2p bearer related parameters of the side of T-FAP1 309 to MSC/MSCe 317. MSC/MSCe 317 may send a bearer update request message that includes A2p bearer related parameters of the side of MGW 313 if bearer parameters have changed. If FGW 311 detects a change in A2p bearer related parameters of side of MGW 313, FGW 311 may send a bearer update request message to T-FAP1 309 and T-FAP1 309 may acknowledge the A2p bearer modification with a bearer update response message. FGW 311 may reply with a bearer update response message to MSC/MSCe 317.

FGW 311 may then initiate the HO between MS 305, S-FAP 307, and T-FAP 309 with a HO procedure 338. HO procedure 338 may begin with FGW 311 sending a HO command message to S-FAP 307 and S-FAP 307 sending a HO direction message to MS 305. S-FAP 307 may also send a HO commenced message to FGW 311 to notify FGW 311 that MS 305 has been instructed to move to the channel of T-FAP1 309. When T-FAP1 309 acquires MS 305, MS 305 may send a HO completion message to T-FAP1 309 and T-FAP1 309 may send a HO complete message to FGW 311. T-FAP1 309 and MGW 313 may now send RTP payloads (shown as 1× VOICE 340). FGW 311 and S-FAP 307 may clear up resources formerly allocated to MS 305 in a clear procedure 342.

Figure 4:
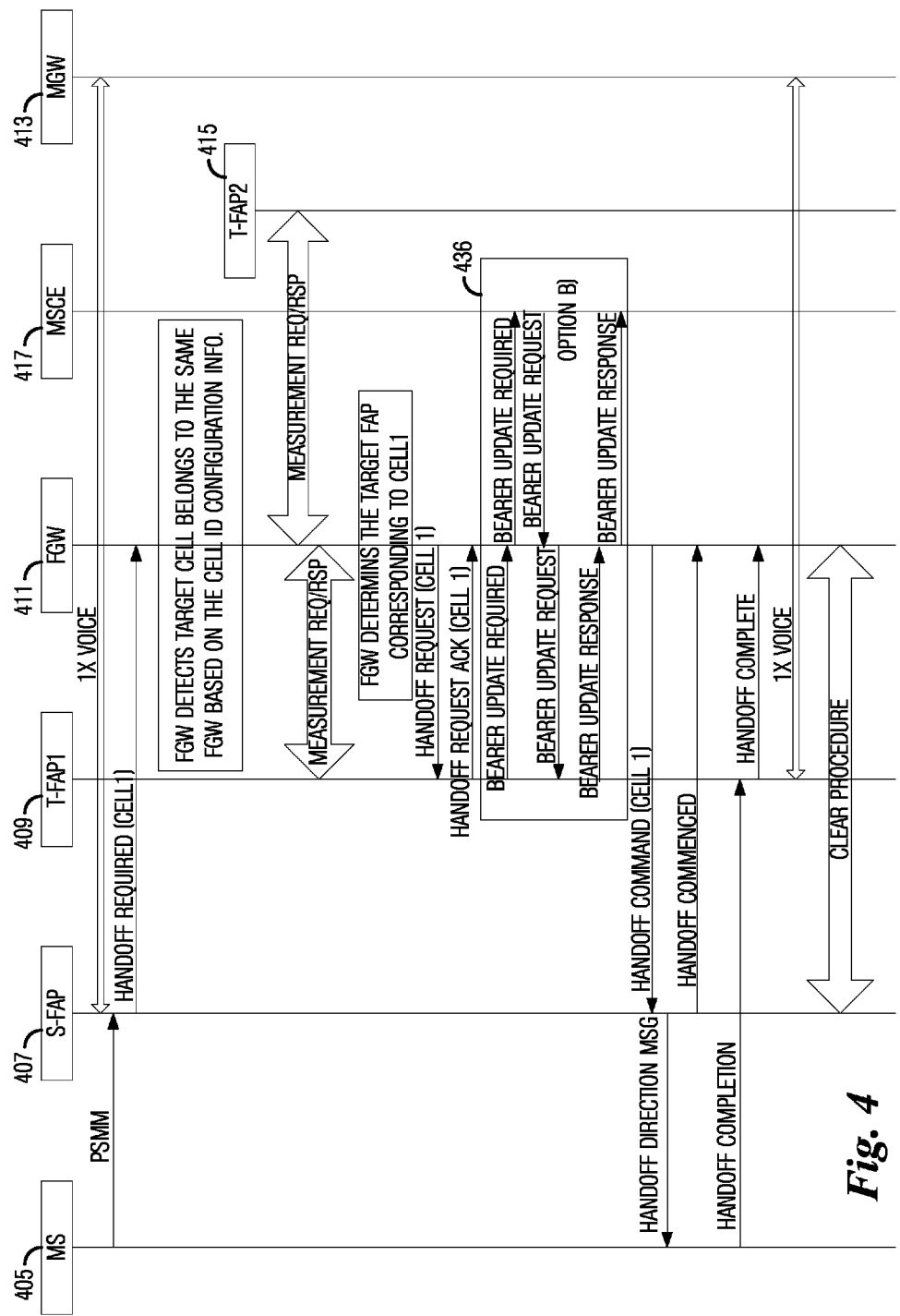
FIG. 4 is a diagram of a message flow of messages/signaling exchanged in a communications system, wherein an inter-FAP handoff is taking place.

FIG. 4 illustrates a message flow of messages/signaling exchanged in a communications system, wherein an inter-FAP handoff is taking place. As shown in FIG. 4, the inter-FAP HO occurs between a MS 405, a source FAP (S-FAP) 407, a first target FAP (T-FAP1) 409, a FGW 411, a MGW 413, a second target FAP (T-FAP2) 415, and a MSC/MSCe 417.

The message flow shown in FIG. 4 is substantially similar to the message flow shown in FIG. 3 with exception of block 436, a bearer update procedure. In block 436, if a HO request acknowledgement from T-FAP 1 409 does not contain A2p bearer related parameters for the side of T-FAP1 409, T-FAP-1 409 may initiate the bearer update procedure (block 436) by sending a bearer update required message containing the A2p bearer related parameters for the side of T-FAP1 409 to FGW 411. FGW 411 may forward a bearer update required message to MSC/MSCe 417 and MSC/MSCe 417 may send a bearer update request message to FGW 411, where the bearer update request message may include A2p bearer related parameters for the side of T-FAP1 409 if the parameters are changed. FGW 411 may send a bearer update request message to T-FAP1 409 and T-FAP1 409 may acknowledge the A2p bearer modification with a bearer update response message. FGW 411 may reply with a bearer update response message to MSC/MSCe 417.

Figure 5:
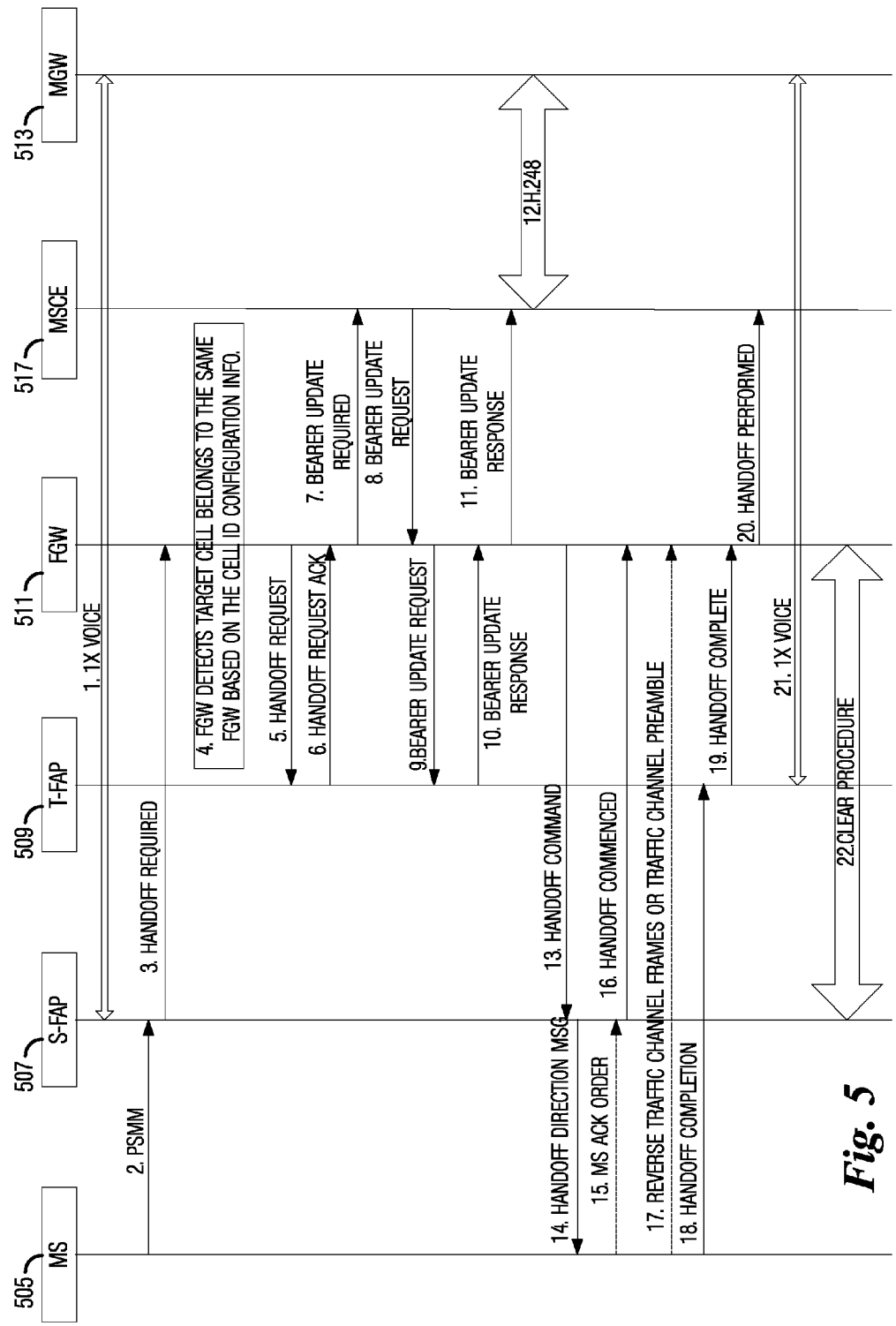
FIG. 5 is a diagram of a message flow of messages/signaling exchanged in a communications system, wherein a CDMA 1× active optimized inter-FAP HO is taking place and a FGW is connected to a MSC/MSCe with a A1p interface.

FIG. 5 illustrates a message flow of messages/signaling exchanged in a communications system, wherein a CDMA 1× active optimized inter-FAP HO is taking place and a FGW is connected to a MSC/MSCe with a A1p interface. As shown in FIG. 5, the inter-FAP HO occurs between a MS 505, a source FAP (S-FAP) 507, a target FAP (T-FAP) 509, a FGW 511, a MGW 513, and an MSCe 517.

The message flow may begin with MS 505 in a voice call via a source macro BS and MSCe 517 (event #1). MS 505 may send a PSMM to S-FAP 507 that includes a PN offset of T-FAP 509 as the strongest neighboring cell (event #2). Based on the PSMM, S-FAP 507 may decide to perform a hard handoff. S-FAP 507 sends a Handoff Required message to FGW 511. The message contains the Cell ID value that maps to PN offset of T-FAP 509 (event #3). FGW 511 may detect that the T-FAP 509 is located under itself (i.e., T-FAP 509 is served by FGW 511) and performs an optimized inter-FAP handoff procedure (event #4). FGW 511 may detect the location of T-FAP 509 using a signal measurement based technique like those described in FIGS. 3 and 4.

FGW 511 may send a Handoff Request message to T-FAP 509 (event #5). T-FAP 509 may allocate the appropriate radio resources and responds with a Handoff Request Acknowledge message (event #6). FGW 511 may initiate a Bearer Update procedure by sending a Bearer Update Required message to MSCe 517 (event #7). T-FAP 509 A2p bearer related parameters are included in the Bearer Update Required message if it is contained in Handoff Request message from T-FAP 509. MSCe 517 may return a Bearer Update Request message including MGW 513 A2p bearer related parameters (event #8).

FGW 511 may forward the Bearer Update Request message to T-FAP 509 (event #9). T-FAP 509 may acknowledge the A2p bearer modification with a Bearer Update Response message (event #10). FGW 511 may return a Bearer Update Response message to MSC/MSCe 517 (event #11). MSCe 517 may use H.248 modification procedure to update A2p bearer info with MGW 513 (event #12). FGW 51 may prepare to switch MS 505 from S-FAP 507 to T-FAP 509 and send a Handoff Command message to S-FAP 507 (event #13). S-FAP 507 may send a Handoff Direction message to MS 505 (event #14).

MS 505 may acknowledge the handoff direction message by sending an MS Ack Order to S-FAP 507 (event #15). S-FAP 507 may send a Handoff Commenced message to FGW 511 to notify it that MS 505 has been ordered to move to a channel of T-FAP 509 (event #16). MS 505 may send reverse traffic channel frames or the traffic channel preamble to target cell(s) (event #17). MS 505 may send a Handoff Completion Message to T-FAP 509 (event #18). T-FAP 509 may send a Handoff Complete message to FGW 511 to notify it that MS 505 has successfully completed the hard handoff (event #19). FGW 511 may send a Handoff Performed message to MSC/MSCe 517 to inform MSCe 517 of handoff operations (event #20). MS 505 is now in a voice call via T-FAP 509 (event #21). FGW 511 initiates call clearing procedures with S-FAP 507 (event #22).

Figure 6:
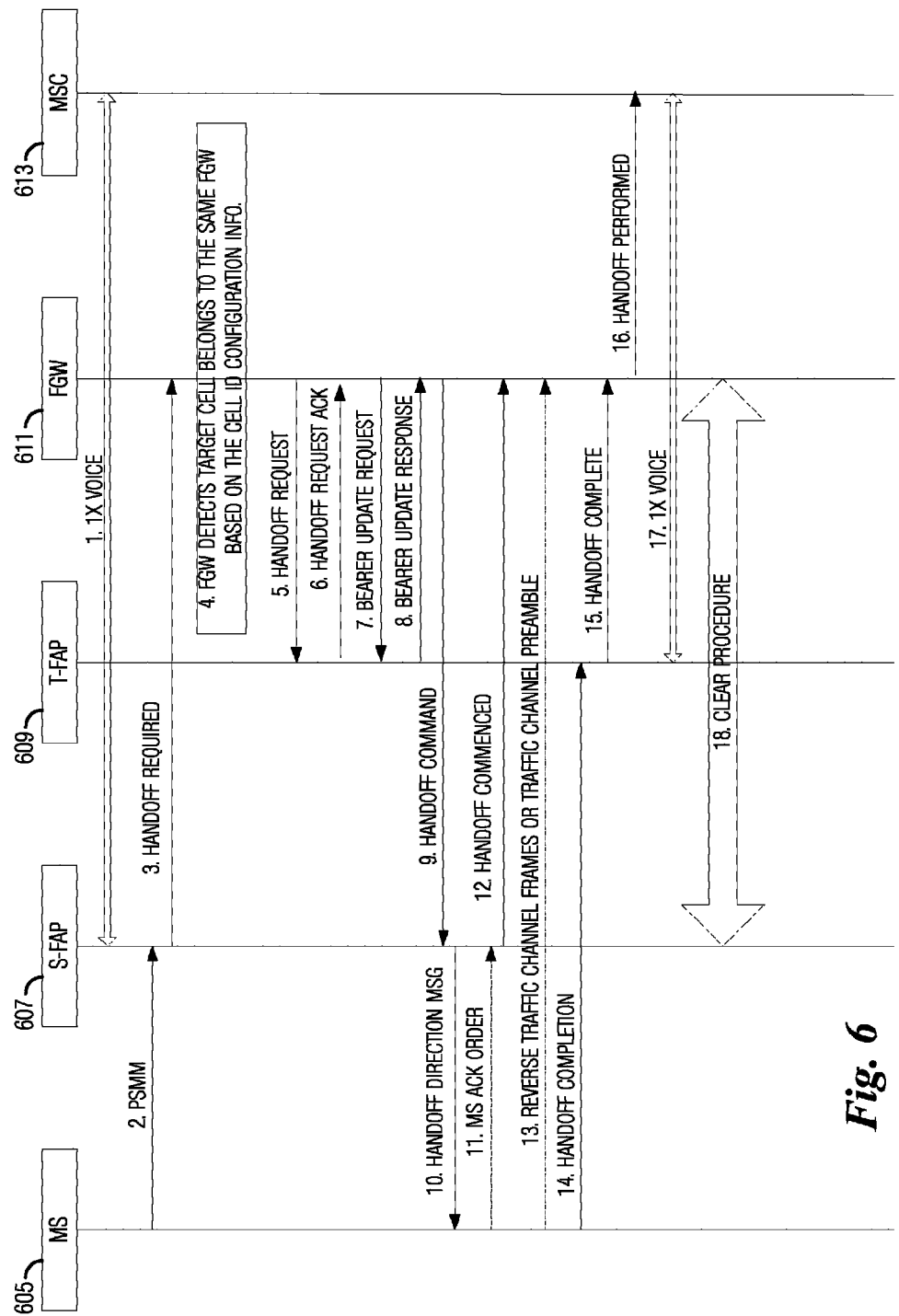
FIG. 6 is a diagram of a message flow of messages/signaling exchanged in a communications system, wherein a CDMA 1× active optimized inter-FAP HO is taking place and a FGW is connected to a MSC/MSCe with a A1 interface.

FIG. 6 illustrates a message flow of messages/signaling exchanged in a communications system, wherein a CDMA 1× active optimized inter-FAP HO is taking place and a FGW is connected to a MSC/MSCe with a A1 interface. As shown in FIG. 6, the inter-FAP HO occurs between a MS 605, a source FAP (S-FAP) 607, a target FAP (T-FAP) 609, a FGW 611, and a MSC 613.

The message flow may begin with MS 605 in a voice call via a source macro BS and MSC 613 (event #1). MS 605 may send a PSMM to S-FAP 607 that includes a PN offset of T-FAP 609 as the strongest neighboring cell (event #2). Based on the PSMM, S-FAP 607 may decide to perform a hard handoff. S-FAP 607 sends a Handoff Required message to FGW 611. The message contains the Cell ID value that maps to PN offset of T-FAP 609 (event #3). FGW 611 may detect that the T-FAP 609 is located under itself (i.e., T-FAP 609 is served by FGW 611) and performs an optimized inter-FAP handoff procedure (event #4). FGW 611 may detect the location of T-FAP 609 using a signal measurement based technique like those described in FIGS. 3 and 4.

FGW 611 may send a Handoff Request message to T-FAP 609 (event #5). T-FAP 609 may allocate the appropriate radio resources and responds with a Handoff Request Acknowledge message (event #6). FGW 611 may initiate a Bearer Update procedures by sending a Bearer Update Required message to T-FAP 609 (event #7). T-FAP 609 acknowledges modification of A2p bearer related parameters with bearer update response message (event #8).

FGW 611 may prepares to switch MS 605 from S-FAP 607 to T-FAP 609 and send a Handoff Command message to S-FAP 607 (event #9). S-FAP 607 may send a Handoff Direction message to MS 605 (event #10). MS 605 may acknowledge the handoff direction message by sending an MS Ack Order to S-FAP 607 (event #11). S-FAP 607 may send a Handoff Commenced message to FGW 611 to notify it that MS 605 has been ordered to move to a channel of T-FAP 609 (event #12). MS 605 may send reverse traffic channel frames or the traffic channel preamble to the target cell(s) (event #13). MS 605 may send a Handoff Completion Message to T-FAP 609 (event #14).

T-FAP 609 may send a Handoff Complete message to FGW 611 to notify it that MS 605 has successfully completed the hard handoff (event #15). FGW 611 may send a Handoff Performed message to MSC 613 to inform MSC 613 of handoff operations (event #16). MS 605 is in a voice call via T-FAP 609 (event #17). FGW 611 may initiate a call clearing procedures with S-FAP 607 (event #18).

The embodiments described above specifically address a CDMA 1×IOS compliant communications system with support for femto cells and femto networks. The embodiments may also be applicable to other types of communications systems, such as 3GPP LTE compliant communications systems with support for HeNB.

Figure 7A:
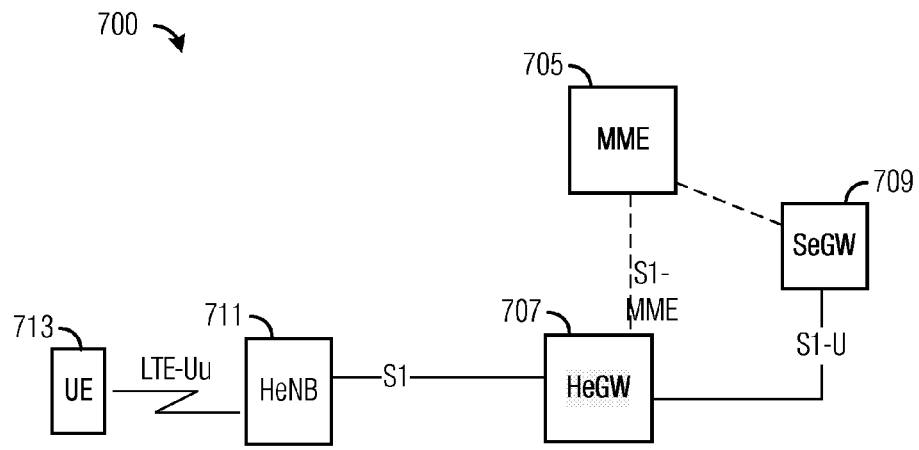
FIG. 7a is a diagram of a 3GPP LTE compliant communications system with support for HeNB.
Figure 7B:
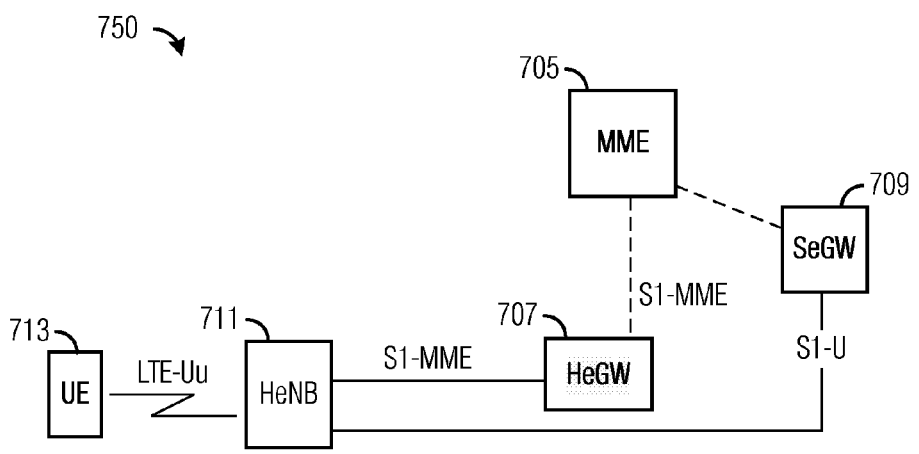

FIG. 7a illustrates a 3GPP LTE compliant communications system 700 with support for HeNB. In 3GPP LTE compliant communications system 700, a media management entity (MME) 705 resides in a control plane and provides S1-MME interface to a home gateway (HeGW) 707. A secure gateway (SeGW) 709 may reside on a user plane and provides S1-U interface to HeGW 707. HeGW 707 may function in a similar manner to a FGW in a CDMA 1×IOS compliant communications system. HeGW 707 may serve multiple HeNB, such as HeNB 711, which in turn may serve multiple user equipment (UE), such as UE 713. FIG. 7b illustrates a control plane 750 of the 3GPP compliant communications system shown in FIG. 7a. In FIGS. 7a and 7b, HeGW 707 may not get involved in the user plane. When an intra-HeGW inter-HeNB HO occurs, HeGW 707 may operate as a FGW does as described above.

Figure 8:
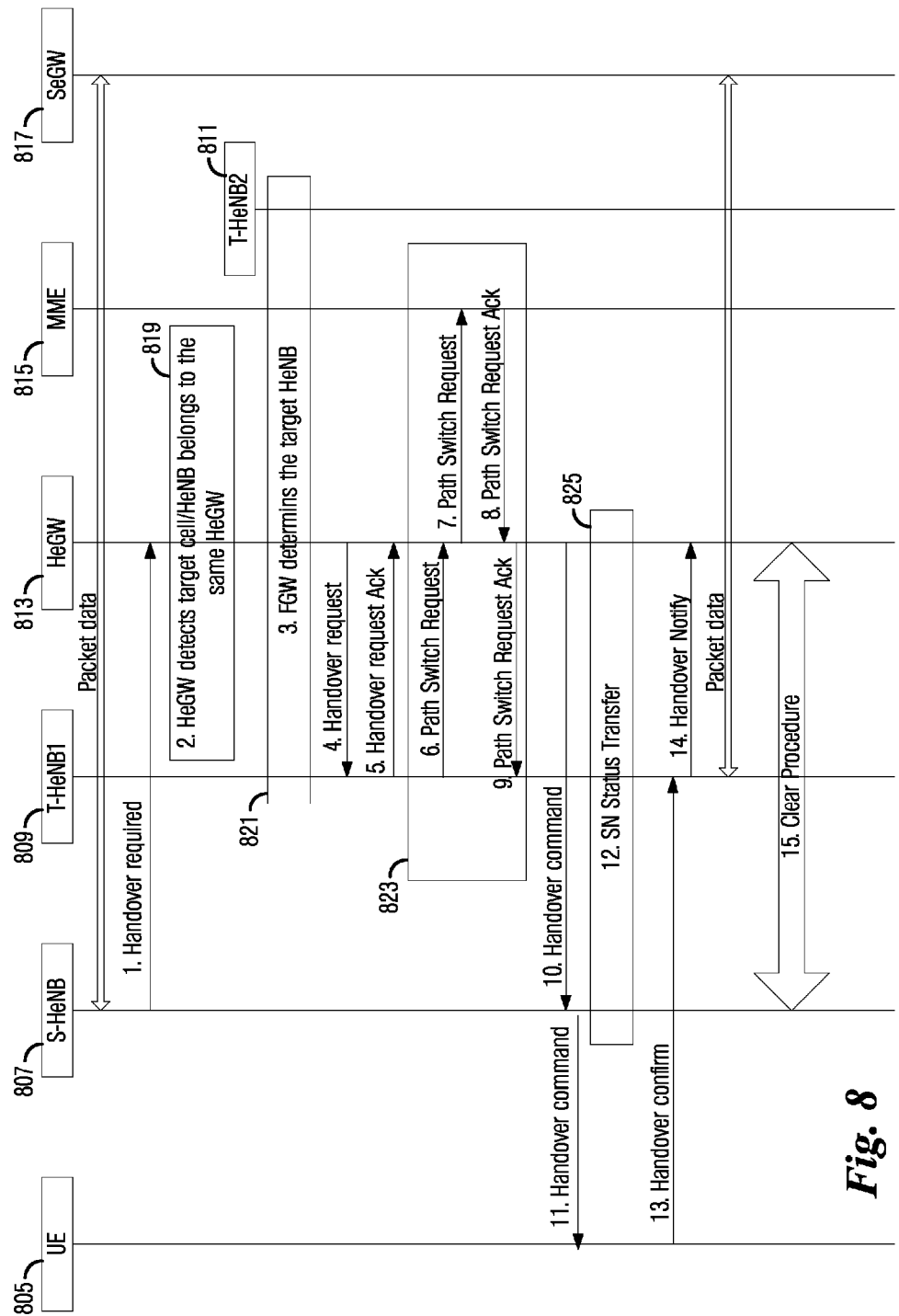
FIG. 8 is a diagram of a message flow of messages/signaling exchanged in a communications system, wherein an intra-HeGW inter-HeNB HO is taking place.

FIG. 8 illustrates a message flow of messages/signaling exchanged in a communications system, wherein an intra-HeGW inter-HeNB HO is taking place. As shown in FIG. 8, the intra-HeGW inter-HeNB HO occurs between a UE 805, a source HeNB (S-HeNB) 807, a first target HeNB (T-HeNB1) 809, a second target HeNB (T-HeNB2) 811, a HeGW 813, a MME 815, and a SeGW 817.

UE 805 may already be participating in a connection, such as an LTE packet data connection (labeled "Packet data"), that may be capable of support voice and/or data with a remote entity. As UE 805 is a mobile device, it may be capable of moving while participating in the connection. As UE 805 moves around, S-HeNB 807, which is be serving UE 805, may detect that UE 805 is beginning to move out of its coverage area and may perform a HO. S-HeNB 807 may send a HO required message to HeGW 813 (event #1). According to an embodiment, the HO required message may contain target cell information. HeGW 813 may examine the target cell information and determine that the HO as requested by S-HeNB 807 is an intra-HeGW inter-HeNB HO (event #2). HeGW 813 may also determine a target HeNB (e.g., either T-HeNB1 809 or T-HeNB2 811) (event #3).

For discussion purposes, let T-HeNB1 809 be the target cell. HeGW 813 may then send a HO request message to T-HeNB 1 809 (event #4). According to an embodiment, in the HO request message, IE 'Transport Layer Address' and 'GTP TEID' are provided by HeGW 813 for receiving uplink data from T-HeNB1 809. T-HeNB1 809 may allocate resources based on information contained in the HO request message and may respond with a HO request acknowledge message to HeGW 813 (event #5).

HeGW 813 and T-HeNB1 809 may both have downlink and uplink GTP tunnel information for packet data transport. The downlink/uplink GTP tunnel information between HeGW 813 and SeGW 817 may remain the same as before the HO.

If the communications system is configured as shown in FIG. 7b, T-HeNB1 809 may send a path switch request message (which includes GTP tunnel information) for downlink data delivery to HeGW 813 (event #6). HeGW 813 may forward the path switch request message to MME 815 (event #7) and MME 815 may respond with a path switch request acknowledge message to HeGW 813 (event #8). According to an embodiment, the path switch request acknowledge message may GTP tunnel information for uplink data delivery. HeGW 813 may forward the path switch request acknowledge message to T-HeNB1 809 (event #9).

If the communications system is configured as shown in FIG. 7a, operations shown as events #6 through #9 are not needed or are optional.

HeGW 813 may send a HO command message to S-HeNB 807 to initiate the HO (event #10). S-HeNB 807 may send a HO command message to UE 805 (event #11). If S-HeNB 807 and T-HeNB1 809 support an X2 interface, S-HeNB 807 may initiate a SN status transfer procedure for PDCP status preservation to T-HeNB1 809 (event #12). If an X2 interface is not supported, the operation shown as event #12 may be omitted.

Once UE 805 acquires T-HeNB 1 809, UE 805 may send a HO confirm message to T-HeNB1 809 (event #13) and T-HeNB1 809 may send a HO notify message to HeGW 813 (event #14). Now, packet data may flow through SeGW 817, HeGW 813, and T-HeNB1 809. HeGW 813 may initiate a clear procedure to release resources reserved at S-HeNB 807 (event #15).

While explicit procedures and message flows have been illustrated for inter-FAP HO for CDMA 1×IOS compliant communications systems and intra-HeGW inter-HeNB HO for LTE compliant communications systems. The embodiments presented herein may be readily modified for use in a general case of intra-femto gateway inter-femtocell HO in a wide range of communications systems. As an example, UMTS inter-HNB HO, WiMAX inter-FAP HO, and so forth, may be supported by the embodiments described herein. The femto gateway may play a vital role in the HO procedure: the femto gateway may determine the occurrence of an inter-FAP HO and may terminate the inter-FAP HO procedure, as well as, coordinates bearer updates between the FAP and the femto gateway and between the femto gateway and the core network.

Figure 9:
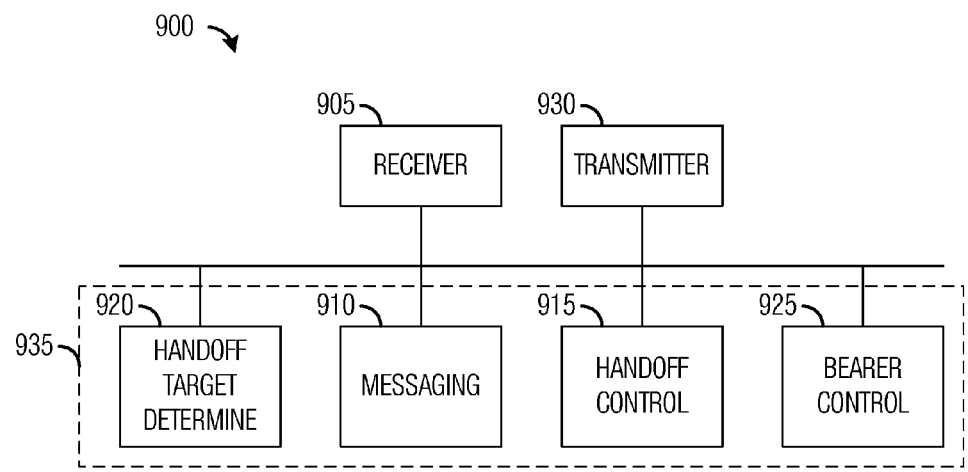
FIG. 9 is a diagram of a gateway.

FIG. 9 provides an alternate illustration of a gateway 900. Gateway 900 may be used to implement various ones of the embodiments discussed herein. As shown in FIG. 9, a receiver 905 is configured to receive transmissions and/or messages from communications devices coupled to gateway 900. Transmissions and/or messages may be received at gateway 900 over a wireline or wirelessly. A messaging unit 910 is configured to create messages from information to be transmitted or extract information from received messages. A handoff control unit 915 may control messaging exchanged with access points (a handoff source and a handoff target), switching controllers, other gateways, and so forth, involved in a handoff in order to facilitate the handoff, such as an inter-FAP handoff.

A handoff target determine unit 920 is configured to determine a handoff target when information provided by a source access point, e.g., target cell information, does not uniquely identify the handoff target. As discussed previously, handoff target determine unit 920 may send information (such as target cell information, MS long code, and so on) to possible handoff targets and request that the possible handoff detect a MS that corresponds to the MS long code. Based on reports from the possible handoff targets, handoff target determine unit 920 may be able to determine the handoff target.

A bearer control unit 925 is configured to update information bearers between the MS involved in the handoff and the handoff target as well as between the handoff target and a core network. Bearer control unit 925 may send/receive information from the handoff target, the MS, and the core network, to update existing information bearers as well as create new information bearers where needed. A transmitter 930 is configured to transmit the messages.

The elements of gateway 900 may be implemented as specific hardware logic blocks. In an alternative, the elements of gateway 900 may be implemented as software executing in a processor, controller, application specific integrated circuit, or so on. In yet another alternative, the elements of gateway 900 may be implemented as a combination of software and/or hardware.

As an example, receiver 905 and transmitter 930 may be implemented as specific hardware blocks, while messaging unit 910, handoff control unit 915, handoff target determine unit 920 and bearer control unit 925 may be software modules executing in a processor 935 or custom compiled logic arrays of a field programmable logic array.

Figure 10:
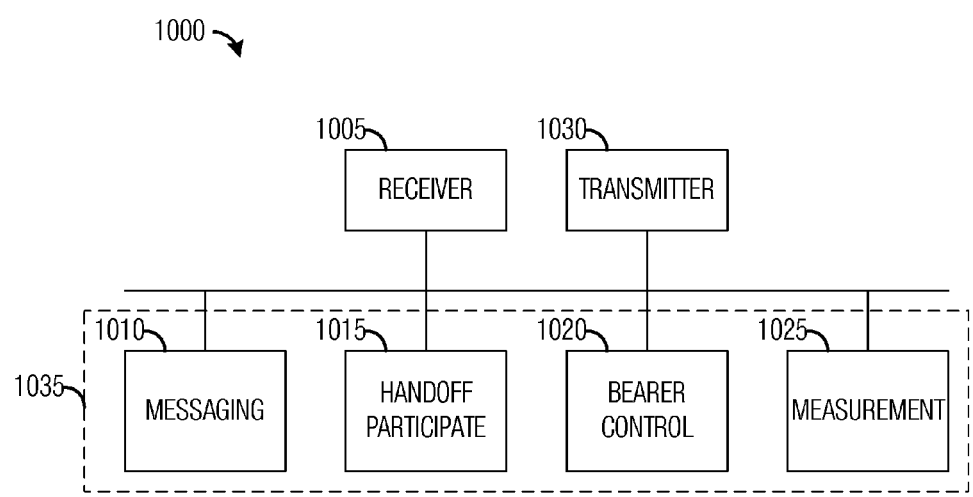
FIG. 10 is a diagram of an access point.

FIG. 10 provides an alternate illustration of an access point 1000. As shown in FIG. 10, a receiver 1005 is configured to receive transmissions and/or messages from communications devices coupled to access point 1000. Transmissions and/or messages may be received at access point 1000 over a wireline or wirelessly. A messaging unit 1010 is configured to create messages from information to be transmitted or extract information from received messages. A handoff participate unit 1015 may control messaging exchanged with gateways, MSs, and so forth, involved in a handoff, such as an inter-FAP handoff.

A bearer control unit 1020 is configured to update information bearers between the access point involved in the handoff and a gateway. Bearer control unit 1020 may send/receive information from the gateway to update existing information bearers as well as create new information bearers where needed. A measurement unit 1025 is configured to measure a MS with an identifier of the MS, such as a specific long code of the MS, and to report the measurement back to the gateway. For example, measurement unit 1025 may measure the signal strength of transmissions made by the MS by detecting transmissions encoded with the long code of the MS. A transmitter 1030 is configured to transmit the messages.

The elements of access point 1000 may be implemented as specific hardware logic blocks. In an alternative, the elements of access point 1000 may be implemented as software executing in a processor, controller, application specific integrated circuit, or so on. In yet another alternative, the elements of access point 1000 may be implemented as a combination of software and/or hardware.

As an example, receiver 1005 and transmitter 1025 may be implemented as specific hardware blocks, while messaging unit 1010, handoff participate unit 1015, bearer control unit 1020, and measurement unit 1025 may be software modules executing in a processor 1035 or custom compiled logic arrays of a field programmable logic array.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a femto gateway (FGW) in communication with a media switching center (MSC), the method comprising:
   receiving, by the FGW, a handoff required message for a communications device from a source femto access point (FAP), wherein the communications device is being served by the source FAP when the handoff required message is received;
   receiving, by the FGW, a plurality of channel measurements reported by a plurality of candidate FAPs, wherein each of the plurality of candidate FAPs are access points anchored to the FGW;
   selecting, by the FGW, a target FAP from the plurality of candidate FAPs in accordance with the plurality of channel measurements; and
   sending, by the FGW, a handoff request message to the target FAP to initiate a handover of the communications device from the source FAP to the target FAP, wherein the source FAP and the target FAP are access points anchored by the FGW, wherein the source FAP does not know which target FAP is being referenced by the handoff required message prior to sending the handoff required message to the FGW, wherein the handoff request message requests a handover of a bearer channel extending from the communications device to the MSC, and wherein the handoff request message is sent from the FGW to the target FAP prior to the MSC being notified of the handover.

2. The method of claim 1, wherein the handoff required message comprises an identity information, and wherein selecting the target FAP comprises selecting the target FAP based on the identity information.

3. The method of claim 2, wherein the identity information identifies the plurality of candidate FAPs as possible handoff targets, wherein the method further comprises requesting that each of the plurality of candidate FAPs detect a communications device participating in a handoff, and wherein a candidate FAP from the plurality of candidate FAPs that reports a highest channel measurement of the communications device is selected as the target FAP.

4. The method of claim 3, wherein the plurality of candidate FAPs detect the communications device in accordance with an identifier associated with the communications device.

5. The method of claim 4, wherein the identifier comprises a long code of the communications device.

6. The method of claim 1 further comprising initiating a bearer update by:
   exchanging bearer related parameters with a switching center;
   determining that a change in bearer related parameters has occurred; and
   sending updated bearer related parameters to the target FAP in response to determining that a change in bearer related parameters has occurred.

7. The method of claim 6, wherein exchanging bearer updated parameters comprises:
   sending a first message to the switching center, the first message comprising bearer related parameters for a handoff target side bearer; and
   receiving a second message from the switching center, the second message comprising bearer related parameters for a gateway side bearer.

8. The method of claim 6, wherein determining that a change in bearer related parameters has occurred comprises detecting a change in bearer related parameters for a gateway side bearer.

9. The method of claim 6, further comprising:
   receiving an acknowledgement message from the target FAP; and
   sending a response message to the switching center.

10. The method of claim 1 further comprising initiating a bearer update by:
    receiving a bearer update required message from the target FAP;
    exchanging bearer related parameters with a switching center; and
    sending updated bearer related parameters to the target FAP in response to determining that a change in bearer related parameters has occurred.

11. The method of claim 1 further comprising clearing resources at the source FAP after the handoff is complete.

12. The method of claim 11, wherein clearing resources at the source FAP comprises sending a message to the source FAP.

13. The method of claim 1 further comprising:
    identifying the plurality of candidate FAPs in accordance with a pseudo noise (PN) offset, wherein the PN offset is specified by the handoff required message; and
    sending a measurement request to each of the plurality of candidate FAPs.

14. The method of claim 1, wherein each of the plurality of channel measurements indicate a signal strength of a channel extending between the communications device and a corresponding one of the plurality of candidate FAPs that reported the channel measurement.

15. The method of claim 14, wherein the plurality of candidate FAPs obtain the plurality of channel measurements by measuring a signal strength of an uplink transmission communicated from the communications device to the source FAP, the uplink transmission being communicated while the source FAP is serving the communications device.

16. The method of claim 15, wherein selecting the target FAP in the plurality of candidate FAPs in accordance with the plurality of channel measurements comprises selecting the target FAP in accordance with a corresponding one of the plurality of channel measurements having a strongest signal strength.

17. A method for operating a home gateway in communication with a media management entity (MME), the method comprising:
receiving, by the home gateway, a handover required message from a source home base station that requires handing over a communications device from the source home base station to another base station, wherein the communications device is being served by the source home base station when the handover required message is received; and
receiving, by the home gateway, a plurality of channel measurements from a plurality of candidate home base stations, wherein each of the candidate home base stations are access points anchored to the home gateway;
selecting, by the home gateway, a target home base station from the plurality of candidate home base stations in accordance with the plurality of channel measurements; and
sending, by the home gateway, a handoff request message to the target home base station to initiate a handover of the communications device from the source home base station to the target home base station, wherein the source home base station and the target home base station are anchored by the home gateway, wherein the source home base station does not know which target FAP is being referenced by the handoff required message prior to sending the handover required message, wherein the handoff request message requests a handover of a communications session associated with a control channel provided by the MME, and wherein the handoff request message is sent from the home gateway to the target home base station before the MME is notified of the handover.

18. The method of claim 17 further comprising transmitting, by the home gateway, a message to the plurality of candidate home base stations requesting a detection of the communications device,
wherein a candidate home base station from the plurality candidate home base stations reporting a highest channel measurement is selected as the target home base station.

19. The method of claim 13 further comprising performing a bearer update by:
transmitting a first message to the target home base station comprising a request to change a current bearer; and
receiving a second message from the gateway, wherein the second message comprises an acknowledgement of the request to change the current bearer, wherein performing the bearer update further comprises receiving a third message from the target home base station comprising a bearer update required indicator and bearer related parameters.

20. The method of claim 17 further comprising:
identify the plurality of candidate home gateways in accordance with a pseudo noise (PN) offset, wherein the PN offset is specified by the handoff required message; and sending a measurement request to each of the plurality of candidate home gateways, wherein the plurality of channel measurements are received in response to the measurement request.

21. The method of claim 17, wherein each of the plurality of channel measurements indicate a signal strength of a channel extending between the communications device and a corresponding one of the plurality of candidate home gateways that reported the channel measurement.

22. The method of claim 21, wherein the plurality of candidate home gateways obtain the plurality of channel measurements by measuring a signal strength of an uplink transmission communicated from the communications device to the source home base station, the uplink transmission being communicated while the source home base station is serving the communications device.

23. The method of claim 21, wherein selecting the target home base station in the plurality of candidate home gateways in accordance with the plurality of channel measurements comprises selecting the target home base station in accordance with a corresponding one of the plurality of channel measurements having a strongest signal strength.

24. A femto gateway (FGW) comprising:
a processor; and
a non-transitory computer readable storage medium storing programming for execution by the processor, the programming including instructions to:
receive a handoff required message for a mobile device from a source femto access point (FAP), wherein the mobile device is served by the source FAP when the handoff required message is received;
receive a plurality of channel measurements from a plurality of candidate FAPs anchored by the FGW;
select a target FAP from the plurality of candidate FAPs in accordance with the plurality of channel measurements; and
send a handoff request message to the target FAP to initiate a handover of the mobile device from the source FAP to the target FAP, wherein the source FAP and the target FAP are access points anchored by the FGW, wherein the source FAP does not know which target FAP is being referenced by the handoff required message prior to sending the handoff required message to the FGW, wherein the handoff request message requests a handover of a bearer channel extending from the MS to a media switching center (MSC), and wherein the handoff request message is exchanged between the FGW and the target FAP prior to the MSC being notified of the handover.

25. The FGW of claim 24, wherein the programming further includes instructions to:
identify the plurality of candidate FAPs in accordance with a pseudo noise (PN) offset, the PN offset being specified in the handoff required message.

26. The FGW of claim 24, wherein the handoff request message is not exchanged with the MSC.

27. A method for operating a femto gateway (FGW), the method comprising:
receiving, by the FGW, a handoff required message from a source femto access point (FAP);
determining, by the FGW, that a target cell is under control of the FGW; and
performing an inter-FAP handoff procedure to handover a mobile station (MS) from the source FAP to a target FAP by sending a handoff request message to the target FAP, wherein the source FAP does not know which target FAP is being referenced by the handoff required message prior to sending the handoff required message to the FGW, wherein the handoff request message requests a handover of a bearer channel extending from the MS to a media switching center (MSC), wherein the handoff request message is transmitted from the FGW to the target FAP before the MSC is notified of the handover, and wherein the FGW determines the target cell based on a measurement procedure that includes: sending measurement requests to a plurality of candidate FAPs, receiving a plurality of signal strengths from the plurality of candidate FAPs, and selecting the target FAP based on results of the measurement request.

28. The method of claim 27, wherein the handoff required message comprises a cell identification (ID) value that identifies the target cell.

29. The method of claim 27, wherein the measurement procedure further comprises:
- identifying the plurality of candidate FAPs in accordance with pseudo noise (PN) offset, the PN offset being specified in the handoff required message; and
- uniquely selecting the target FAP that reports a strongest signal strength, wherein at least some of the candidate FAPs detect the MS based on a long code of the MS.

30. The method of claim 27 further comprising:
- initiating a bearer update procedure by sending a bearer update required message to the MSC, wherein the bearer update required message comprises one or more target bearer related parameters if the one or more target bearer related parameters are comprised in a handoff request message;
- receiving a bearer update request message from the MSC;
- forwarding the bearer update request message to the target FAP;
- receiving a bearer update response message from the target FAP; and
- forwarding the bearer update response message to the MSC.

31. The method of claim 27 further comprising initiating call clearing procedures with the source FAP.

32. The method of claim 27, wherein the handoff request message is not exchanged with the MSC.

* * * * *